(12) United States Patent
Shapiro et al.

(10) Patent No.: US 6,729,647 B2
(45) Date of Patent: May 4, 2004

(54) FOLDING STEERING ASSEMBLIES FOR WHEELED DEVICES

(76) Inventors: Richard N. Shapiro, 2248 Haversham Close, Virginia Beach, VA (US) 23464; Philip A. Gurecki, 4855 Braden Crescent, Norfolk, VA (US) 23502

( * ) Notice: Subject to any disclaimer, the term of this patent is extended or adjusted under 35 U.S.C. 154(b) by 150 days.

(21) Appl. No.: 10/108,550

(22) Filed: Mar. 29, 2002

(65) Prior Publication Data

US 2003/0184043 A1 Oct. 2, 2003

(51) Int. Cl.[7] .............................................. B62D 11/18
(52) U.S. Cl. ............. 280/775; 280/93.504; 280/93.513; 280/639; 180/208
(58) Field of Search .......................... 280/775, 93.504, 280/93.51, 93.513, 93.514, 214, 215, 220, 234, 639; 180/208

(56) References Cited

U.S. PATENT DOCUMENTS

| | | | | |
|---|---|---|---|---|
| 3,556,549 A | * | 1/1971 | Hershman et al. | 280/775 |
| 4,752,085 A | * | 6/1988 | Yamamoto | 280/775 |
| 5,036,942 A | * | 8/1991 | Loewen | 180/329 |
| 5,551,719 A | * | 9/1996 | Rettger, Jr. | 280/282 |
| 6,068,295 A | * | 5/2000 | Skabrond et al. | 280/775 |
| 6,607,207 B2 | * | 8/2003 | Shapiro et al. | 280/287 |

* cited by examiner

*Primary Examiner*—Paul N. Dickson
*Assistant Examiner*—Toan C To (57) ABSTRACT

An arrangement is provided for folding and stowing of a steering assembly in combination with virtually any nature of wheeled devices which include at least one "steerable" wheel, so that a more thin, stowed profile is achieved. All components of the steering assembly/dashboard are integrated into a generally parallel plane and profile without use of a separate "steering column," so that the assembly, when folded, is conveniently stowed within the side elevational profile of the wheeled device. The folding steering assembly embodiments may be adapted to any steerable wheeled devices, with fixed or stowable wheels, whether user occupied, or remote controlled, and including wheeled devices specially equipped with implements (e.g., material handling, imaging, scientific or measurement, agricultural, landscaping, lawn-mowing as but a few examples).

30 Claims, 7 Drawing Sheets

FOLDING STEERING ASSEMBLIES FOR WHEELED DEVICES

RELATIONSHIP TO OTHER APPLICATIONS

The invention here is related to those disclosed in U.S. application Ser. No. 09/271,274 filed on Mar. 17, 1999, and now U.S. Pat. No. 6,220,611 granted Apr. 24, 2001, as well as U.S. patent application Ser. No. 09/604,769, filed on Jun. 28, 2000, and most specifically, to U.S. application Ser. No. 09/848,334, filed on May 4, 2001, entitled "Wheeled Personal Mobility Devices with Collapsible Wheel Axle Assemblies and Integrated Steering and Propulsion Linkages".

FIELD OF THE INVENTION

The present invention relates to virtually any nature of wheeled devices which include at least one "steerable" wheel and steering means that allow for selective steering and rotation of the wheel, in connection with pedal or motive powered devices, cycles, "go-carts", recumbent cycles, and more particularly to unique attributes which allow for folding and stowing of a steering assembly in combination with such wheeled devices. Once such steering assemblies are folded, they occupy interior space substantially within the side elevational profile of the wheeled device. Without limiting the generality of the foregoing, the folding steering assembly disclosures may be adapted to any steerable wheeled devices, with fixed or stowable wheels, whether user occupied, or remote controlled, and including wheeled devices specially equipped with implements (e.g., material handling, imaging, scientific or measurement, agricultural, landscaping, lawn-mowing as but a few examples).

BACKGROUND OF THE INVENTION

In the referenced previous patent applications, there is disclosed pivoting wheel axle assemblies and other novel folding and collapsible components for wheeled devices. This particular application offers a number of improvements for wheeled devices with steering assemblies so that an ultra thin, convenient stowed profile may be achieved. Several varieties of folding wheeled devices were also disclosed in the above-referenced application of co-inventors Shapiro and Gurecki, Ser. No. 09/848,334.

SUMMARY OF THE INVENTION

This application discloses methods to fold steering assemblies in a convenient manner so that the steering assemblies stow in a parallel plane with the side elevational profile of a wheeled device, and may then be moved into an erected position similar to a typical steering assembly used on commercially available wheeled devices offering steering means. In this disclosure, all steering assembly apparatus is maintained in a parallel plane occupied by the steering means or steering wheel, and the usual standard "steering column" is wholly eliminated, although coordinated steering of one or two rotatable wheels is provided. The steering linkage integrated within the interior compartment steering assembly (which occupies a defined plane) interconnects with at least one steering linkage outside the interior compartment which may travel adjacent to a portion of the support frame, or inside the support frame for example, and then link with at least one steerable wheel.

In the above-mentioned application filed by Shapiro and Gurecki, one or more embodiments disclosed the basics of folding a steering column along with a steering assembly on wheeled personal mobility devices. Typically, on three- or four-wheeled steerable vehicles, automobiles, go-carts, and other wheeled devices, a steering column is provided, which emanates from the steering assembly in a generally perpendicular angle from the steering assembly/dashboard, and one of several methods of transverse steering linkage arms is employed remote from the steering assembly/dashboard, whereby (on a four wheel device) bi-lateral wheeled steering is provided, and the wheels will turn in tandem.

Not only has the prior art failed to provide for the disclosed folding steering means and steering assemblies that can control one or more wheels, but the prior art also does not disclose a method for eliminating elongated steering columns on a folding steering assembly interconnecting with a steerable wheel, which dramatically improves the possibilities for creating an overall ultra-thin stowed profile for such wheeled devices.

The present invention enables convenient and quick folding of a steering assembly with or without an actual steering dashboard, and provides for a steering assembly and/or dashboard which incorporates all steering assembly parts in a parallel profile with said apparatus, which will allow for bilateral steering of a set of tandem wheels or, alternatively, a single wheel.

An object of the invention is to eliminate several typical steering components and/or incorporate them into a thin profile steering assembly, and provide for a very simple method of not only providing steering, but having the steering assembly conveniently fold into the side elevational profile of a wheeled mobility device, with manually manipulable means to retain or latch such assembly in a stowed or erected position.

Another object of the invention is to provide for a foldable steering assembly which may also work conveniently with fixed wheeled axle devices where such wheels do not move or stow at all but will still allow for a thinner stowed profile by allowing for folding and stowing of the steering assembly.

Another object of the invention is to provide that the folding steering assembly or dashboard components can be adapted with pedal power or any type of motive power system.

Another object of the invention is that the foldable steering assembly components may interact through rigid steering arms or through a series of cables, bands, or reciprocating cables, rather than rigid arms.

Another object of the invention is to provide such folding steering assemblies on vehicles which include equipment and implements, including, without limiting the generality of the foregoing, to those steerable wheeled devices including material handling, agricultural, lawn-mowing, landscaping, scientific, imaging or measurement, as but several examples, and to provide that any and all such variants may also have remote control operation.

Further features and advantages of the present invention will be set forth in, or apparent from, the detailed description of preferred embodiments thereof which follows.

BRIEF DESCRIPTION OF THE DRAWINGS

FIG. 1-A is a top plan view of the first preferred embodiment of a four-wheel version of the invention, omitting certain aspects of the embodiment and is the suggested figure for the cover page of the patent;

FIG. 2-A is a longitudinal cross-section perspective, partly broken away, of a portion of the dashboard;

FIG. 5 is a latitudinal cross-sectional perspective of the folding dashboard including certain steering components;

FIG. 5-A is a partially detached perspective of the hinged or universal joint component of the steering link arm shown in FIG. 5;

FIG. 5-B is a latitudinal cross-sectional perspective, partly broken away, of the folding dashboard and steering link components, shown in another alternative embodiment;

DESCRIPTION OF THE PREFERRED EMBODIMENTS

Figure 1:
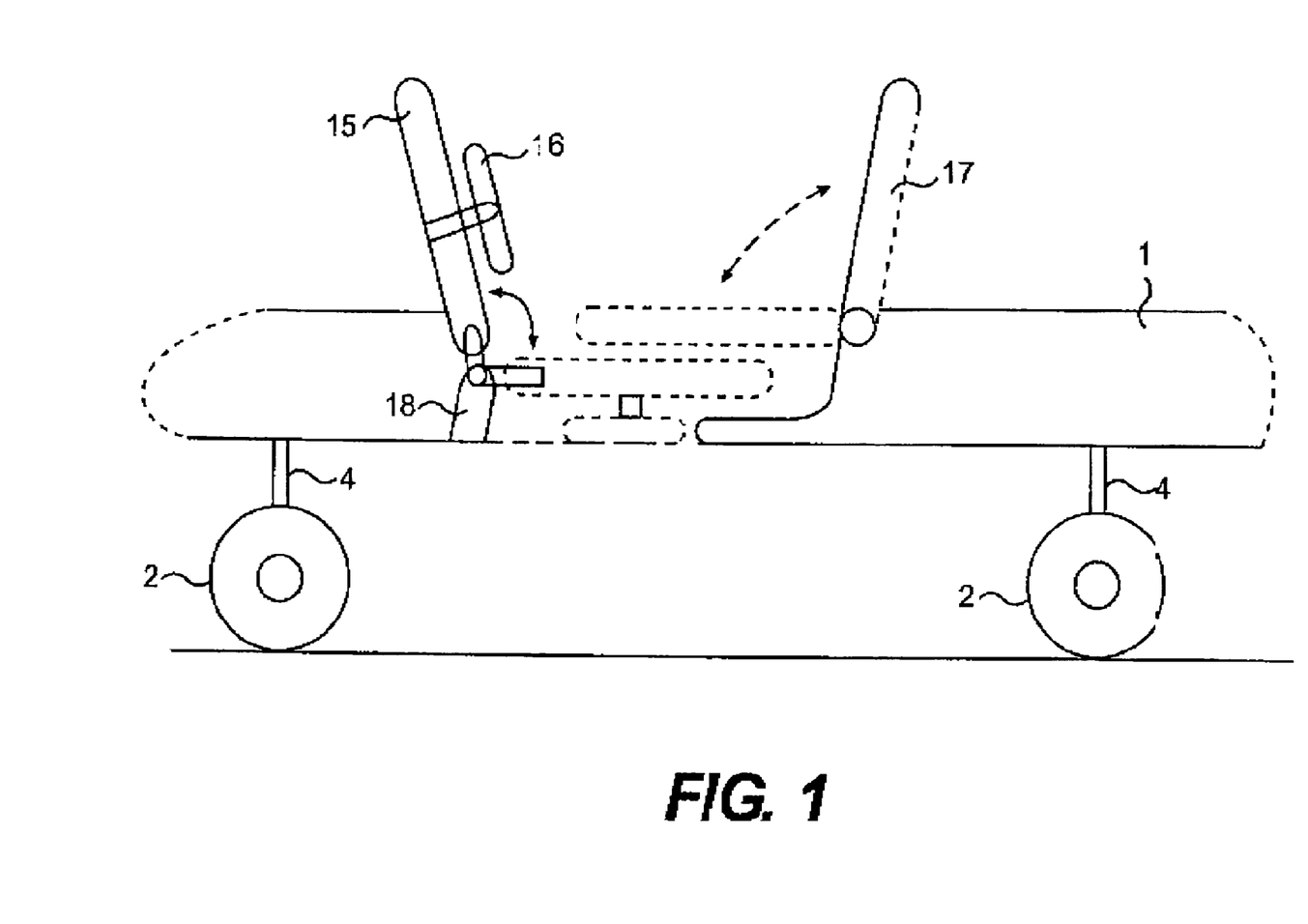
FIG. 1 is a side elevational view of a cart in accordance with a preferred embodiment of the invention.

Referring to the drawings, FIG. 1 shows a four-wheel cart (also shown in FIG. 1-A), focusing solely on the innovation of a folding steering assembly which may include a dashboard. More particularly, the device includes four wheels, 2, and a suitable support frame/side frame, 1 which forms an outer perimeter of the device. Steering means, 16, preferably a steering wheel, but which may include any other suitable shape of steering means, is mounted in any suitable manner to a dashboard, 15 (instead of being a full dashboard, it is understood that this "dashboard" may encompass nothing more than a method to house the steering assembly components discussed in more detail below in this application). The dashboard, 15, pivots on a dashboard-hinged base connector, 18, by any suitable method, and the steering assembly dashboard 15 and steering means/wheel 16 generally form a parallel plane. The steering wheel, 16, and dashboard, 15, when not in their erected state shown in FIG. 1 may be folded and stowed into the side elevational profile of the cart device. And depending on the particularized construction, any suitable rigid or flexible seat back, 17, may also be moved and stowed into the side elevational profile, and as shown here, this may (in this embodiment) take place after the folding of the steering assembly and dash, 15. This side elevational view does not show the device base, 21, which may include fixed and/or flexible components, and may be mounted to any suitable parts of the support frame, 1, while leaving any number of suitable openings or cavities. The area within the said support frame/side frame 1 generally forms an interior compartment of the device (not shown by any number, but explained for definitional purposes). Also, this embodiment, for simplicity, does not depict any type of implement or apparatus which may also be mounted to such wheeled devices.

Referring to FIG. 1-A, the top plan view is seen of the same cart, with all of the major components in a stowed position, generally parallel and within the plane of the side elevational profile of the wheeled device. Four wheels or any suitable number of wheels, 2, connected by wheel axles, 4, are mounted to movable and/or pivoting wheel axle assemblies, 3, mounted to the support frame/side frame of the cart device, 1, and the area inside the perimeter of the support frame/side frame 1 is definitionally the "interior compartment" of the device. As disclosed in previously referenced applications, the wheel axle assemblies may be latched or released by virtue of manual manipulation of finger latches, 5, by the user reaching into the finger latch access recesses, 6, and by squeezing such latches inward, the entire wheel axle assemblies, 3, may be manipulated into the erected position (not shown). In the preferred embodiment, 1-A, the forward wheels, 2, closest to the pedals, 19, incorporate means to link with the steering wheel, 16, so that the wheel translates bi-lateral motion to said wheels. The rear wheels, 2, are equipped with a wheel drive belt (or chain), 7, mounted to a belt lip, track or sprocket, 9, which is incorporated onto one side of the rear wheels, 2. The wheel drive belt, 7, travels around a wheel drive gear, 8, mounted to one side of the wheel axle assembly, 3. Once the rear wheels, 2, are placed into their erected position, the drive gears, 8, are forced into linkage with a separate side frame drive gear, 32 (not shown here, shown in FIG. 7), which side frame drive gear interacts with a side frame drive belt (or chain), 31 (not shown here, shown in FIG. 7). In any case, the side frame drive belt, 31, travels around a gear mounted to the pedal drive axle, 19.

The innovation of this particular application relates to the design of simple steering and dash assembly components, with the basic dashboard shown at 15 in FIG. 1-A.

Figure 6:
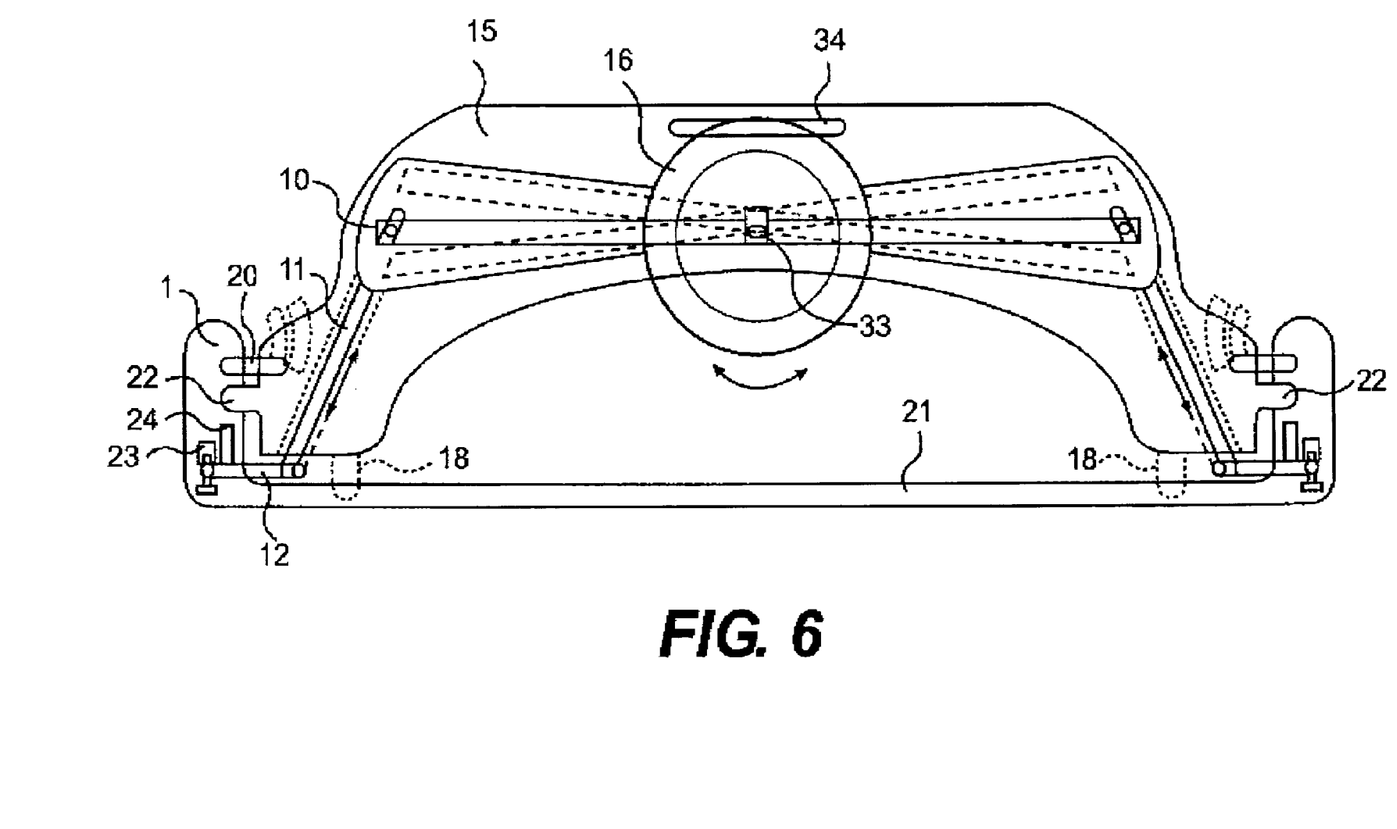
FIG. 6 is an end elevational perspective of the erected steering and dashboard assembly, partially in cross section.

Further referring to FIG. 1-A, any suitable steering wheel or steering means, 16, are fixed to the dashboard assembly, 15. A central portion of the steering wheel, 16, shaft travels through a suitably shaped portion, 33, of the transverse steering linkage, 10. Although not shown in FIG. 1-A, any suitable protruding or shaft portion of the steering wheel, 16, may travel through the shaped opening, 33, in the transverse steering linkage, 10, and then is secured against detachment. It is best to refer to FIG. 1-A as well as FIG. 6, to explain the manner in which the components interact. Referring to FIG. 6, when the user turns the steering wheel, 16, it allows a central shaped shaft portion of the steering wheel to manipulate through the like-shaped opening of the transverse steering linkage, 10. The transverse steering linkage, 10, is retained inside an appropriately shaped cavity inside the dashboard, 15, which may be constructed from two separate screwed-together portions, or from two separable composite components. The transverse steering linkage, 10, interconnects on both left and right with steering link arms, 11, which may be interconnected together by a pin or any suitable protrusion, but the lower portion of the steering link arms, 11, ultimately is shaped in a suitable fashion so that it interacts with a separate component, 12, denoted as the steering linkage connector, which is seen in FIG. 6 as well as FIG. 1-A. The steering assembly dashboard 15, and the steering means/wheel 16 occupy a generally parallel plane. As will be more fully described below, the steering linkage connectors, 12, cause movement of a separate side frame steering linkage, 24 (seen in FIG. 6 and several other figures). In this general fashion, movement of the steering wheel causes the movement to translate through the various components to a side frame steering linkage, which causes movement of the "steering" (rotatable) wheels, in FIG. 1-A, being the forward wheels, 2. As shown in previous applications filed by Shapiro and Gurecki, the steering wheels, 2, are mounted to wheel axles, 4, and a portion of the wheel axle, 4, travels through the wheel assembly, 3. Mounted to a portion of the axles, 4, is a shaped steering gear, 13 (shown in FIG. 1-A), such that when the front wheels are erected, movement of the steering side frame steering linkages, 24, causes steering movement of the forward wheels, 2. While this figure, and the others in this application indicate movable and stowable wheels, the innovations described are equally applicable to non-stowable (but steerable) wheels.

Figure 2:
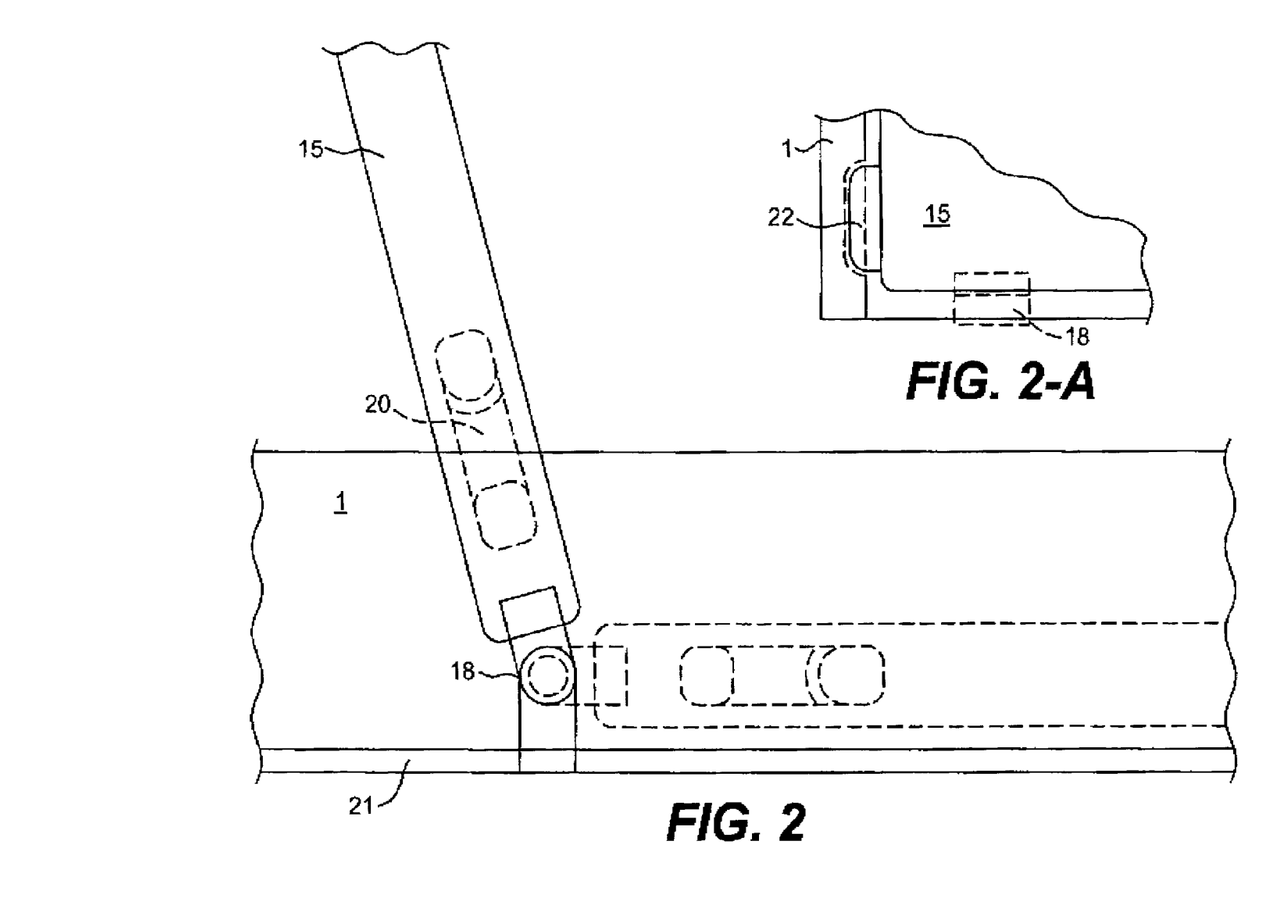
FIG. 2 is a side elevational perspective, simplified by isolating the steering dashboard components.

Referring to FIG. 2, the view shows the dashboard, 15, in an erected state, mounted on a dashboard hinge base connector, 18, and the ghost perspective then shows the same dashboard, 15, in a stowed position within the side elevational profile of the cart side wall, 1, in close proximity above the cart base, 21. The particular embodiment of the folding dashboard in FIG. 2 features a hinge base connector, 18, mounted to the cart base, 21. Instead, as shown in FIG. 2-A, the dashboard need not be mounted to the cart base as shown in ghost perspective 18, but instead may have an integrated dashboard hinge, 22, on both sides, proximate where the dashboard meets the side frame, 1, as shown in FIG. 2-A. If an integrated dash hinge, 22, is incorporated into the dashboard, then the dashboard hinge connector, 18, shown in FIG. 2-A, may be eliminated entirely. Referring back to FIG. 2, the dashboard retention element, 20, may serve to lock and release the dashboard, 15, not only in the erected position shown in FIG. 2, but may serve to lock the folding dashboard in the stowed position shown in FIG. 1-A. The retention element, 20, may be resiliently and manually releasable by the user, or may be spring-biased such that the user must particularly manipulate the retention element in the erected or stowed positions.

Figures 3, 4:
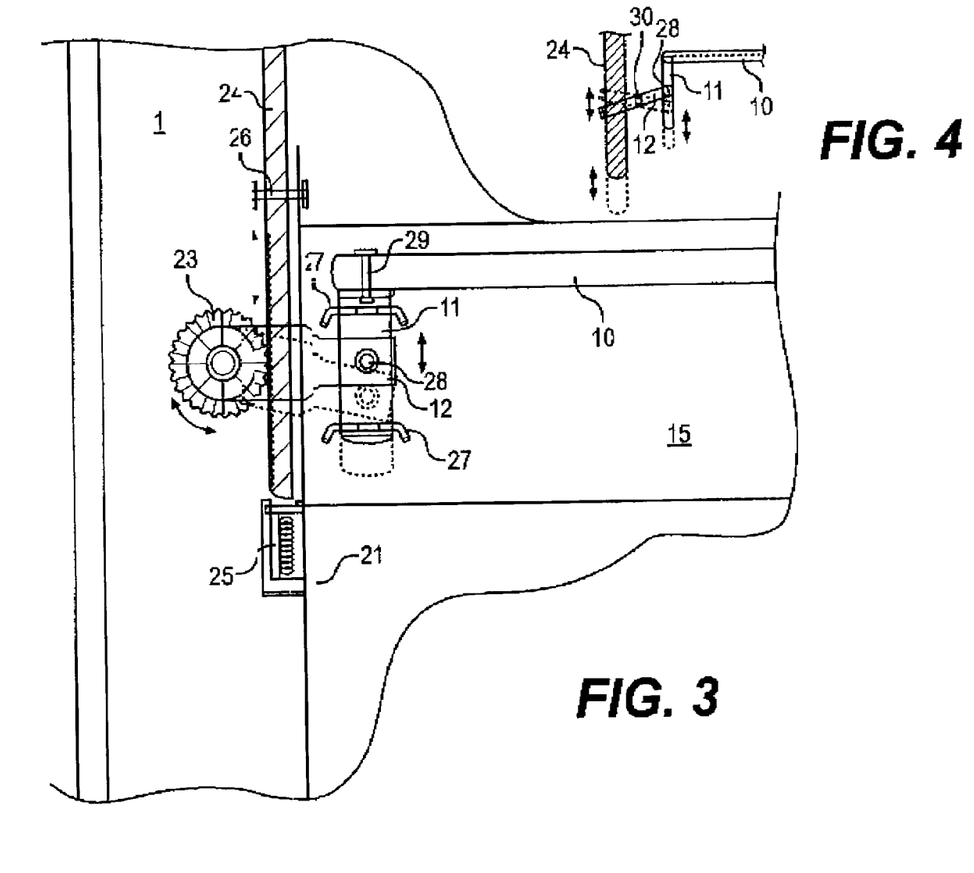
FIG. 3 is a top plan view, partly broken away, of the dashboard and side frame.
FIG. 4 is also a top plan view, partially broken away, omitting certain features, and including an alternative embodiment of several of the steering connector components.
Figures 5, 5A:
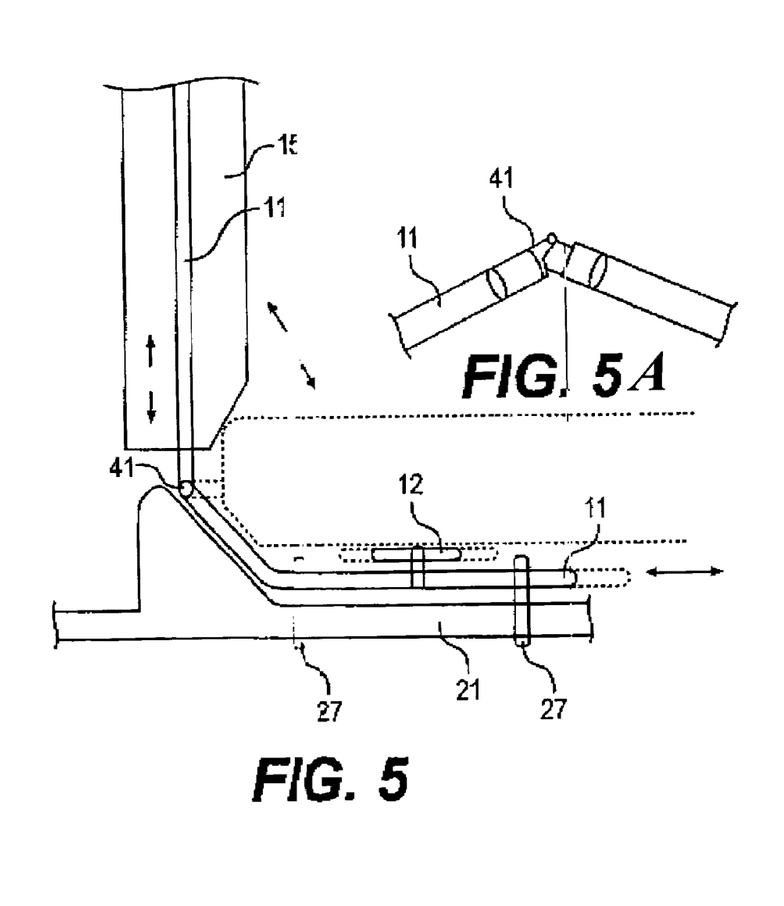

Referring cumulatively to FIGS. 3 to 5-B, the particular methods linking the steering system to the side frame steering linkage are shown, and in addition, methods are shown for hinging or folding each steering link arm, 11. First, referring to FIG. 3, the top plan view shows the transverse steering linkage, 10, interconnecting to the steering link arm, 11, by any suitable protrusion or recess, here shown with a linkage pin, 29, in FIG. 3. The transverse steering linkage, 10, is incorporated into any suitable recess or cavity portion of the dashboard, 15, along with the steering link arms, 11, one of which is shown in FIG. 3. The steering link arm is shaped at its lowest-most portion proximate to the cart base and may be retained to the cart base, 21, by one or more suitable retainers, 27, which retainers are in some manner affixed to the cart base, 21. The steering link arm, 11, is interconnected to the steering linkage connector, 12, by any suitable linkage protrusion, 28. The steering linkage connector is mounted to a steering linkage connector gear, 23. Then, the steering linkage connector gear, 23, reciprocates with the side frame steering linkage, 24, which linkage, 24, may be maintained in position by virtue of a steering linkage retaining guide, 26. Also, the side frame steering linkage, 24, is forced into a neutral or central position by contact with a steering linkage spring assembly, 25 (shown in FIG. 3). The opposite end of the side frame steering linkage, 24 (not shown in FIG. 3), may include a similar steering linkage spring assembly to that shown at 25 to maintain the steering linkage, 24, in a neutral position, but alternatively, the steering wheel, 16 (not shown in FIG. 3), may be maintained in a neutral position by spring assemblies located alternatively within the cavities formed in the area where the transverse steering linkage, 10, travels inside the dashboard assembly (see FIG. 6), or a third alternative position may be to limit travel of the steering link arms, 11, with such springs. As described elsewhere, movement of the transverse steering linkage, 10, causes pushing or pulling of the steering link arm, 11, which serves to cause the gear, 23, to reciprocate and move the steering linkage inside the side frame, 24. This causes movement of the steering gear, 13, which moves the wheel axle, 4, and steers the front wheels, 2 (as also can be seen in FIG. 1-A) in tandem. The gear, 23, position in relation to the side frame steering linkage, 24, may be reversed to the opposite side as desired for proper turning of the rotatable wheels. Additionally, gear 23, as well as gear 13 adjacent to the wheel axle 4 may be finely adjusted to effect appropriate gearing ratios in connection with desired movement of the steering wheel, 16. While FIG. 3 (and FIG. 8) show the above linkages in a preferred embodiment, it is appreciated that instead of rigid, interconnected arms, a series of flexible, reciprocating cables or belts may be employed at least in part, with the net result still effecting the desired steering movements between the folding steering assembly component, and at least one of the steerable wheels (not shown).

FIG. 4 shows an alternative method of moving the side frame steering linkage, 24, differently from FIG. 3. In FIG. 4, there is a similar transverse steering linkage, 10, which similarly pushes and pulls steering link arm, 11, which also causes movement of the steering linkage connector, 12, but there is an additional pivot pin, 30, which pin is mounted to either a portion of the dashboard itself (not shown), or to a portion of the cart base, 21 (also not shown). The steering linkage connector, 12, causes movement of the side frame steering linkage, 24, by being interconnected with it, or traveling through it, but in any case, this design eliminates the need for the steering linkage connector gear, 23.

Figure 5B:
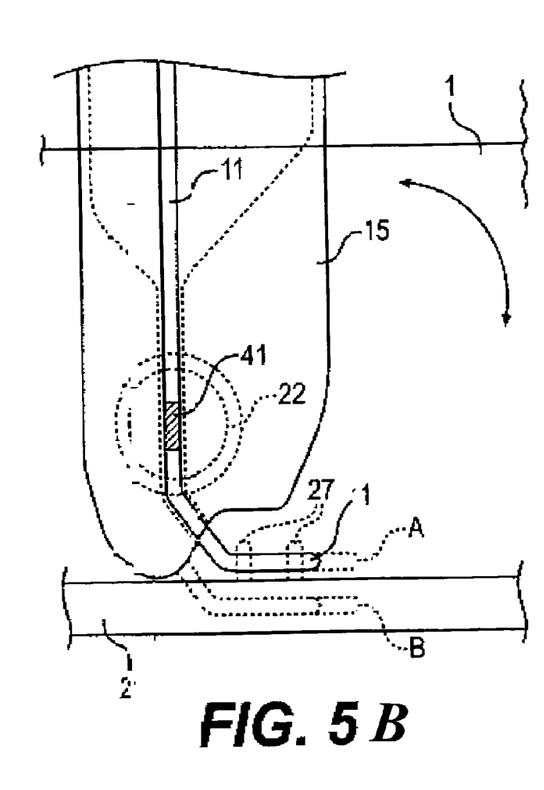

FIGS. 5, 5-A, and 5-B detail the folding dashboard and hinged joint of the steering link arm, 11. Referring first to FIG. 5, in this embodiment is shown the dashboard erected at 15, the steering link arm, 11, traveling through the dashboard, 15, a hinge or universal joint portion, 41, of the steering link arm, 11, is shown, and the lowest-most portion of the steering link arm, 11, is shaped and travels adjacent to and just above the cart base, 21. Retainers, 27, serve to hold and retain the steering link arm, 11, into position so that the steering linkage connector, 12, is interconnected to the linkage arm, 11, and as described elsewhere, the steering linkage connector, 12, connects to the side frame steering linkage, 24, which travels inside the side frame, 1. In FIG. 5, the dashboard, 15, is shown folding about 90° generally into a stowed position parallel with the side elevational profile of the device (shown in ghost perspective). When the dashboard, 15, is folded, the steering link arm, 11, also folds due to a hinge or universal joint, 41, which forms a portion of the steering link arm, 11. FIG. 5-A shows a broken away partial perspective of the steering link arm, 11, and a universal joint permitting the folding of such steering link arm. Alternatively, though not shown, it is appreciated that the linkage arm, 11, may simply have a suitable hinge joint rather than a universal joint. Referring to FIG. 5-B, a different embodiment of the folding dashboard components is shown. The dashboard assembly, 15, is shown in the erected position and the steering linkage arm, 11, is shown traveling through a portion of the dashboard assembly with dotted or dashed lines showing what forms a cavity which essentially forces the steering linkage arm at its lower-most portion to travel down and under the retainers, 27, although other components including the steering linkage connector, 12, are not shown for simplified perspective here. In this embodiment, the dashboard component, 15, is constructed so that an integrated dashboard hinge, 22, is formed on either end proximate to the interior facing side frame, which becomes the pivoting point for the dashboard assembly to stow or fold near to 90° into the side elevational profile of the device. Also, the steering link arm, 11, includes a hinge or universal joint, 41, which component is actually not visible outside the dashboard in usage, so that when the user arranges to fold the dashboard 90° to a stowed position, the dashboard pivots along the integrated dash hinge, 22, and at the same time, the steering link arm, 11, bends and pivots at the universal joint, 41. FIG. 5-B also indicates that the steering link arm, 11, may be hidden generally under the dashboard assembly, 15, out of view of the user of the cart device indicated at "A", or as indicated by the dashed line perspective shown at "B", the steering link arm portion traveling outside the dashboard assembly, 15, may alternatively travel under or inside a cavity in the cart base, 21, instead of having a position above the floor of the cart base, 21. One or more of the various components outlined above may be integrated together to eliminate separate parts, including, but not limited to the retainers, 27, which, for but one example, may instead be molded as part of the cart base, 21.

FIG. 6 components have been previously discussed and additionally, it is noted that there is a hand grasp portion, 34, so the user may manipulate the steering assembly and/or dashboard from either the erected or the stowed position, and such hand grasp location may be anywhere suitable, or there may be more than one. While this application shows in FIG. 6 but one specific method of causing reciprocating movement of the steering linkage arm 10 and linkages, 11, it is readily apparent that numerous other simple methods may effectuate the desired movement, while generally providing for the desired reciprocating movement within the parallel plane of the folding steering assembly concept outlined herein.

Figure 7:
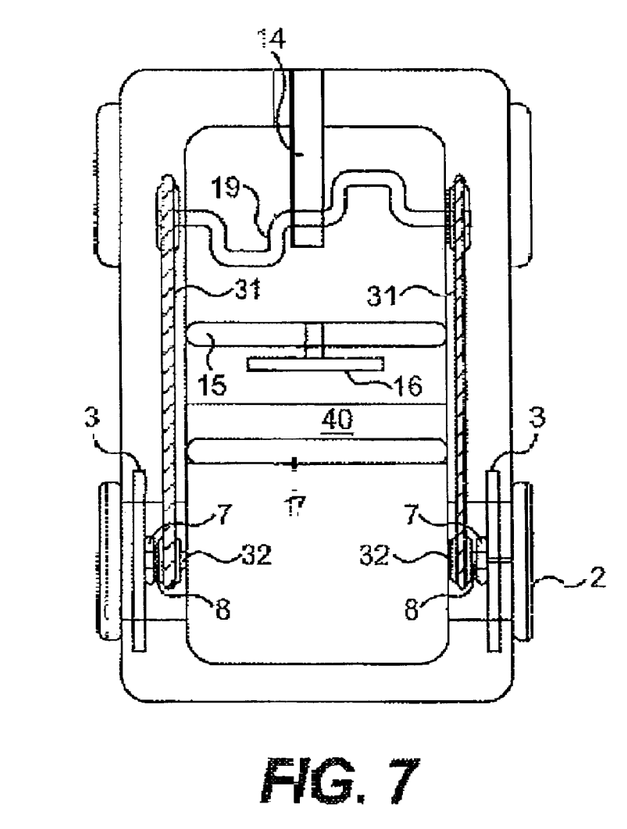
FIG. 7 is a top plan view of an embodiment of the cart of the invention, showing drive linkages.

FIG. 7 shows a similar top-plan perspective to FIG. 1-A but incorporates or shows certain other features and eliminates certain features shown in FIG. 1-A. In FIG. 7, the dashboard and steering wheel are erected, a seat back, 17, is shown, and the seat bottom, 40, is also indicated, which is mounted to any suitable portion of the support frame, 1. In this and all embodiments shown elsewhere, the support base, 21, may include an integrated seat bottom, 40, and the base 21 may leave any number of suitable open areas, depending on preferred configuration. In this cutaway view in FIG. 7 is shown the side frame drive belt or chain, 31, which travels around the pedal drive axle, 19, and motion of the drive belt, 31, is translated through a side frame drive gear, 32, to a wheel drive gear, 8, which moves the wheel drive belt or chain, 7. Also shown is a center frame support, 14, which serves to brace the pedal drive axle, 19, shown here in FIG. 7 as well as in FIG. 1-A. This center frame support, 14, may instead of being an elongated shape, may comprise any suitable shape or even may be eliminated in favor of a more complete cart base, 21, which may instead have a suitable opening or cavity area to allow for reciprocation of the pedals, 19.

Figure 8:
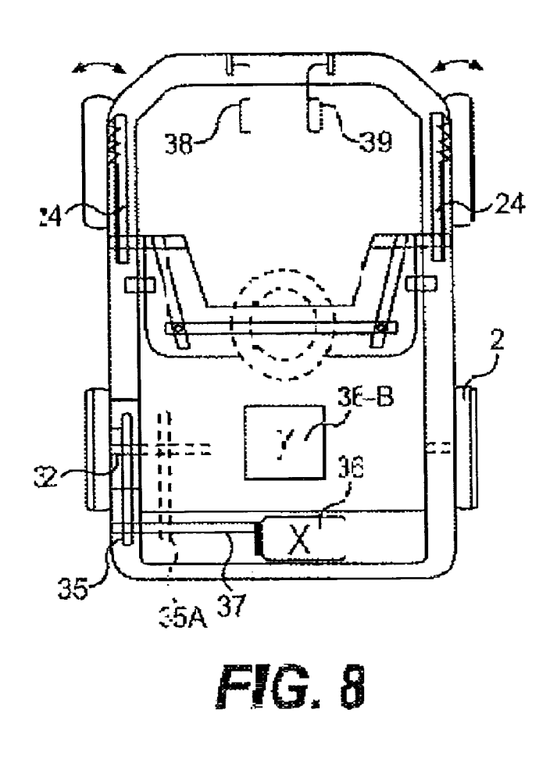
FIG. 8 is a top plan view of an alternative embodiment of the cart of the invention, providing for a motive power source.

FIG. 8 shows a different embodiment of a cart device, which cart device includes not a pedal-drive axle, but rather motive power generally shown at 36 with the X inside the box. The location of the motive drive (any motive source may be used, such as battery, fuel cell, or motor, including more than one power source) may instead be located in any other suitable position, and may be partly mounted to the support frame, 1, or the cart base, 21 (not shown). This embodiment includes the same type of folding dashboard components as described elsewhere; however, indicates that a power drive, 37, travels out of the motive power source, 36, around which a power drive belt or chain, 35, translates motion (and the location of the power drive belt or chain may be moved from inside the side frame shown in 35, or into an alternative position adjacent to or under the cart base shown at 35-A). The power drive belt, 35, travels around the side frame drive gear, 32, which also drives a wheeled drive belt or chain, 7, mounted around a wheel drive gear, 8 (neither of which is shown in this perspective in FIG. 8). FIG. 8 also shows a typical brake pedal, 38, and an accelerator, 39.

While the various figures and perspectives shown in this application detail methods whereby a folding steering assembly and dashboard may be incorporated into a system using movable and stowable wheel axle assemblies, any of the embodiments of the folding steering assembly shown herein may be applied to fixed axle wheeled devices providing the benefit that the typical steering column components are eliminated, and a thinner profile for such fixed wheel axle devices may be attained. Accordingly, any typical standard fixed wheel axle devices may be provided with a folding steering assembly or dashboard embodiment herein, and the steering wheels which turn and "steer", even with fixed wheels, may be mounted with a wheel axle arrangement similar to that shown in FIG. 1-A, with a steering gear mounted onto any portion of a wheel axle (as shown at 13 in the same figure), and such fixed wheeled devices may thereby be provided with suitable steering incorporated into the dashboard assembly, and a foldable dashboard assembly.

In another alternative embodiment, rather than include a "steering gear" as a part of a rotatable wheel axle, that reciprocates with a side frame steering link, instead the side frame steering link may simply connect to, and cause movement of, any suitable set of components interacting with the rotatable wheels which provide steering rotation for such a fixed axle wheeled device (not shown in figures).

The embodiments shown include four wheels, although the folding steering components may equally be adapted to three wheel devices with a single forward or single rear wheel design. The steering linkage arms which move in the side frame may interact with any number of the wheels to provide steering, irrespective of whether fixed or stowable wheel axles are provided. Further, as briefly mentioned, steering interaction between the steering means (e.g., steering wheel) and any number of rotating wheels may be effectuated through any suitable combination of rigid arms or linkages, as well as flexible cable or belts, to translate movement to the wheel or wheels.

Also, it is understood that the steerable vehicle disclosed may include one or more seats, or no seats along with remote control operation of the steering means (eliminating need for a typical steering wheel, yet still providing for the steering assembly and that all its parts be contained in a generally parallel plane), and additionally that virtually any nature of equipment or implement may be mounted to a portion of said device (e.g., material handling, imaging, scientific or measurement devices, agricultural, lawn-mowing, landscaping, as but several examples).

Although the invention has been described above in relation to preferred embodiments thereof, it will be understood by those skilled in the art that variations and modifications can be effected in these preferred embodiments without departing from the scope and spirit of the invention.

What is claimed:

1. A steerable wheeled device comprising:
   a support frame defining a side elevational profile and having an outer perimeter defining an interior space;
   a plurality of wheels mounted on said support frame;

a steering apparatus defining a plane and being movably mounted within said interior space;

said steering apparatus including a steering member and at least a first steering linkage operable by the steering member, both said steering member and said at least one steering linkage being disposed so as to be at least close to being within the plane defined by said steering apparatus, said steering apparatus including at least further steering linkage positioned at least partly outside of said interior space, said further steering linkage being disposed so as to be at least close to being within the plane defined by the steering apparatus;

said further steering linkage being adapted, in use, to be linked to said first steering linkage and to at least one of said plurality of wheels so that user-selected movement of the said steering member imparts a steering movement to said at least one said wheel; and said steering apparatus being movable between a first, operative, erected position wherein the apparatus extends outwardly at an angle from the side elevational profile of said support frame, and a second, inoperative, stowed position wherein the steering apparatus is disposed so as to be at least close to being within the side elevational profile of said support frame and within the interior space.

2. A device according to claim 1 wherein said first steering linkage and said further steering link are linked together in both the first, erected position, and the second, stowed position, of said steering apparatus.

3. A device according to claim 1 further comprising at least one manually operated retaining means for retaining the steering apparatus in said first, operative position.

4. A device according to claim 3 wherein said at least one manually operative retaining means also retains the steering apparatus in said second, stowed position thereof.

5. A device according to claim 1 further comprising at least one manually operated retaining means for selectively retaining the steering apparatus in both said first and second positions thereof.

6. A device according to claim 1 wherein said steering apparatus includes a steering cable and at least one wheel includes a component coupled to said steering cable such that movement of said steering member produces movement of said steering cable to thereby effect a steering movement of said at least one wheel.

7. A device according to claim 1 wherein said first steering linkage includes at least one hinge.

8. A device according to claim 1 wherein said first steering linkage includes at least one joint.

9. A device according to claim 1 wherein at least one wheel of said plurality of wheels is movable between a first, erected position wherein the at least one wheel provides rolling support, and a second, stowed position wherein said at least one wheel is disposed substantially within the side elevational profile of said support frame.

10. A device according to claim 1 wherein the steering linkages comprise a combination of rigid links and flexible belts.

11. A device according to claim 1 wherein the steering linkages comprise a plurality of flexible belts.

12. A device according to claim 1 further comprising auxiliary equipment removably mounted on said support frame, said equipment being selectively controllable by a user.

13. A device according to claim 12 wherein said auxiliary equipment comprises equipment selected from the group consisting of agricultural, landscaping, material handling, imaging, monitoring, scientific measurement equipment and combinations thereof.

14. A device according to claim 1 wherein at least one of the steering linkages includes a chain mounted on at least one sprocket.

15. A device according to claim 1 wherein a portion an axle of at least one wheel includes a portion linked to one of said steering linkages such that movement of said steering member produces movement of said one steering linkage to effect movement of said wheel.

16. A device according to claim 1 further comprising a user propelled set of pedals to provide propulsion of at least one of said wheels.

17. A device according to claim 1 further comprising battery powered propulsion means for providing propulsion of at least one of said wheels.

18. A device according to claim 1 further comprising a motor for providing propulsion of at least one of said wheels.

19. A device according to claim 1 further comprising a fuel cell for producing propulsion of at least one of said wheels.

20. A device according to claim 1 further comprising auxiliary equipment removably mounted on said support frame, said equipment including grass cutting apparatus.

21. A device according to claim 1 wherein said steering apparatus includes a housing having a cavity therein and said first linkage and said further linkage are linked together within said cavity.

22. A device according to claim 1 further comprising a base member mounted on said support frame and including a cavity, the first steering linkage and said further steering linkage being linked together within said base.

23. A device according to claim 1 wherein said support frame includes a cavity therein and said first steering linkage and said further steering linkage are linked together within said cavity.

24. A device according to claim 1 wherein the steering apparatus includes at least one hand grasp portion for providing movement of said steering apparatus between said first and second positions.

25. A device according to claim 1 wherein the steering member is of a substantially round wheel shape including a shaft portion connected to, and interacting with, at least one steering linkage of said steering apparatus.

26. A device according to claim 1 further comprising at least one selectively adjustable seat removably mounted on said support frame.

27. A device according to claim 26 wherein said at least one seat is movable to a stowed position in a plane at least substantially within the side elevational profile of said support frame.

28. A device according to claim 1 wherein the movement of at least one of said steering linkages is translated into movement of at least one other of said steering linkages in an opposing direction to thereby impart matching directional steering to at least two of the said wheels.

29. A device according to claim 1 further comprising at least one biasing spring disposed adjacent to a fixed surface of the device so as to be in contact with at least one of steering linkages for biasing at least one of the said steerable wheels so as to be into a neutral position and for biasing the steering member into a neutral position.

30. A device according to claim 1 wherein the steering linkages comprise a combination of rigid links and flexible cables.

* * * * *